3,018,217
INSECT REPELLENT WAX COMPOSITION AND METHOD OF TREATING AREAS THEREWITH

Willis N. Bruce, Champaign, Ill., assignor to Lee Ratner, Chicago Ill.
No Drawing. Filed Nov. 21, 1957, Ser. No. 697,804
3 Claims. (Cl. 167—22)

This invention relates to insect repellent compositions and more particularly to insect repellent wax-containing compositions, and to the use thereof.

This application is a continuation-in-part of my copending application Serial No. 570,696, filed March 12, 1956, now U.S. Patent 2,937,969. This application Serial No. 570,696 discloses and claims compositions comprising lower alkyl esters of maleic acid, fumaric acid and succinic acid with various carriers and discloses such compositions with and without a carrier as being particularly suitable for repelling flies. One of the compositions disclosed but not specifically claimed consists of di-n-butyl succinate mixed with a minor amount of paraffin.

Further investigations established that the compositions of the above mentioned application are not only suitable for repelling flies but are also suitable for repelling various other insects including lone star ticks, night flying insects, box elder bugs, termites, confused flour beetles, Drosophila, no-see-ums ants, and roaches of all types, tests having been made on German, American and Oriental roaches.

Wax compositions containing lower alkyl esters of maleic, fumaric and succinic acids were found to be suitable for repelling the above-mentioned insects and particularly for repelling roaches. It was also found that when such compositions were applied to a surface such as a floor, wood panel, wall or the like, a coating containing as little as .5% or even less of the ester was repellent to insects over a period of several days and when its repellency had diminished to a negligible factor its repellency would be renewed to substantially its original potency by simply polishing the surface of the coating.

The wax compositions of this invention can be made by dispersing the lower alkyl esters of maleic, fumaric or succinic acid separately or mixed together with any wax composition. For emulsion-type wax coating compositions the lower alkyl ester is dispersed in the aqueous medium by agitation along with the wax and other ingredients. For solvent-type wax coating compositions the lower alkyl esters are dissolved in the solvent.

The amount of the lower alkyl esters in the wax composition can be varied widely. Satisfactory results have been obtained with compositions containing from 0.2 to 50% by weight and higher, of a lower alkyl ester of maleic, fumaric or succinic acids on the basis of the total solids, the total solids consisting essentially of wax to which there may be added minor portions of other solids such as resin and plasticizers.

The wax coating composition of this invention can be applied the same way as any ordinary wax coating composition, such as by spraying or brushing on the surface to be treated.

Generally it is advantageous to make application of the wax coating repellent in a manner so as to deposit from 2 to 50 grams of the actual ester per 100 square feet (20 to 500 milligrams per square foot) of surface. However, larger or smaller amounts can be applied as desired, amounts on the order of down to 5 milligrams or less per square foot of surface being applicable, more frequent polishing being necessary with the smaller amounts to renew the activity.

The following examples are given to illustrate my invention:

EXAMPLE 1

The following floor wax coating composition was made by mixing the ingredient together in any order with agitation sufficient to produce an emulsion:

| Ingredients: | Amount in parts by weight |
|---|---|
| Carnauba wax | 70 |
| Ceresin wax | 30 |
| Morpholine | 11 |
| Ammonium hydroxide (28% $NH_3$) | 5 |
| Water | 928 |
| Di-n-butyl succinate | 1 |

Test No. 1

Panels of wood 3 inches square were treated as follows:

Two panels were treated on both sides with the above wax coating composition which, upon evaporation of the water, gave a film of wax containing di-n-butyl succinate, the amount of coating on the panel having 100 milligrams of ester per square foot. These panels were then placed face-to-face with a space of 3/16 inch between panels.

Two additional panels were coated in the same way with wax compositions the same as above except that the di-n-butyl succinate was omitted. These two panels were likewise placed face-to-face with a space of 3/16 inch between the panels.

After the wood panels were dried thoroughly before an electric fan, they were placed in an open receptacle into which a population of German roaches was introduced.

Positions of panels were changed at least once daily to avoid the possible effect of having the roaches select preferred sites. Each count given below represents the average of the day's counts.

| Day | Percent on Treated | Percent on Untreated |
|---|---|---|
| 1 | 0 | 100 |
| 2 | 0 | 100 |
| 3 | 0 | 100 |
| 4 | 2.5 | 97.5 |
| 5 | 0 | 100 |
| 6 | 5 | 95 |
| 7 | 0 | 100 |
| 8 | 0 | 100 |
| 9 | 2.5 | 97.5 |
| 10 | 10 | 90 |
| 11 | 15 | 85 |
| 12 | 30 | 70 |

After the 12th day the test was concluded. Two weeks later, however, it occurred to me that repellency might be regenerated if the panels were polished with a dry cloth. This was done (no additional wax or di-n-butyl succinate was added) with the result that 100% repellency was achieved for another 4 days, 95% on the 5th day, 85% on the 6th day, after which the test was again concluded.

EXAMPLE 2

The following floor wax coating composition was made by mixing the ingredients together with stirring:

| Ingredients: | Amount in parts by weight |
|---|---|
| Paraffin wax | 20 |
| Carnauba wax | 15 |
| Ceresin wax | 10 |
| Naphtha | gallons 7 |
| Heavy mineral oil | do .75 |
| Di-n-butyl succinate | 1.0 |

Test No. 2

Panels of wood 3 inches square were treated as follows:

Two panels were treated on both sides with a film of the floor wax of Example 2 except for the di-n-butyl succinate. These panels were then placed face-to-face with a space of 3/16 inch between panels.

Two additional panels were treated with a film of the floor wax of Example 2 containing the di-n-butyl succinate. These 2 panels were likewise placed face-to-face, with a space of 3/16 inch between panels.

After the wood panels were dried thoroughly before an electric fan, they were placed in an open receptacle into which a population of German roaches was introduced. Counts were made several times daily to determine percentage of roaches resting in spaces between the panels. Positions of panels were changed at least once daily to avoid the possible effect of having the roaches select preferred sites. Each count given below represents the average of the day's counts:

| Day | Percent on Treated | Percent on Untreated | Day | Percent on Treated | Percent on Untreated |
|---|---|---|---|---|---|
| 1 | 0 | 100 | 26 | 15 | 85 |
| 2 | 0 | 100 | 27 | 10 | 90 |
| 3 | 0 | 100 | At this point the panels were polished with a dry cloth. No additional wax or di-n-butyl succinate was added. Polished panels were thereupon subjected once again to the roaches. | | |
| 4 | 0 | 100 | | | |
| 5 | 0 | 100 | | | |
| 6 | 0 | 100 | | | |
| 7 | 0 | 100 | | | |
| 8 | 0 | 100 | | | |
| 9 | 0 | 100 | | | |
| 10 | 0 | 100 | | | |
| 11 | 0 | 100 | 28 | 0 | 100 |
| 12 | 0 | 100 | 29 | 0 | 100 |
| 13 | 0 | 100 | 30 | 0 | 100 |
| 14 | 0 | 100 | 31 | 0 | 100 |
| 15 | 0 | 100 | 32 | 0 | 100 |
| 16 | 0 | 100 | 33 | 0 | 100 |
| 17 | 0 | 100 | 34 | 0 | 100 |
| 18 | 0 | 100 | 35 | 0 | 100 |
| 19 | 0 | 100 | 36 | 5 | 95 |
| 20 | 0 | 100 | 37 | 10 | 90 |
| 21 | 10 | 90 | 38 | 5 | 95 |
| 22 | 20 | 80 | 39 | 5 | 95 |
| 23 | 0 | 100 | 40 | 10 | 90 |
| 24 | 10 | 90 | 41 | 15 | 85 |
| 25 | 5 | 95 | 42 | 5 | 95 |

EXAMPLE 3

The following resin type floor wax was made by mixing the ingredients and agitating until an emulsion was obtained:

| Ingredients: | Amount |
|---|---|
| Solid polyethylene resin | 40 |
| Morpholine | 7 |
| Carnauba wax | 100 |
| Dibutyl phthalate | 2.5 |
| Ester gum | 30 |
| Ammonium hydroxide (28% ammonia) | 5 |
| Water | 585 |
| Di-n-butyl succinate | 1.5 |

Test No. 3

Panels of wood three inches square were treated as follows:

Two panels were treated on both sides with a film of the floor wax of Example 3 except for the omission of di-n-butyl succinate. These panels were then placed face-to-face with a space of 3/16 inch between panels.

Two additional panels were treated with a film of the floor wax of Example 3 containing di-n-butyl succinate. These panels were likewise placed face-to-face, with a space of 3/16 inch between panels.

After the wood panels were dried thoroughly before an electric fan, they were placed in an open receptacle into which a population of German roaches was introduced. Counts were made several times daily to determine percentage of roaches resting in spaces between the panels. Positions of panels were changed at least once daily to avoid the possible effect of having the roaches select preferred sites. Each count given below represents the average of the day's counts:

| Day | Percent on Treated | Percent on Untreated | Day | Percent on Treated | Percent on Untreated |
|---|---|---|---|---|---|
| 1 | 0 | 100 | At this point the panels were polished with a dry cloth. No additional wax or di-n-butyl succinate was added. Polished panels were thereupon subjected once again to the roaches with the following results: | | |
| 2 | 0 | 100 | | | |
| 3 | 0 | 100 | | | |
| 4 | 0 | 100 | | | |
| 5 | 0 | 100 | | | |
| 6 | 0 | 100 | | | |
| 7 | 0 | 100 | | | |
| 8 | 0 | 100 | | | |
| 9 | 0 | 100 | 18 | 0 | 100 |
| 10 | 0 | 100 | 19 | 0 | 100 |
| 11 | 0 | 100 | 20 | 0 | 100 |
| 12 | 0 | 100 | 21 | 0 | 100 |
| 13 | 0 | 100 | 22 | 0 | 100 |
| 14 | 0 | 100 | 23 | 0 | 100 |
| 15 | 0 | 100 | 24 | 5 | 95 |
| 16 | 25 | 75 | 25 | 5 | 95 |
| 17 | 20 | 80 | 26 | 10 | 90 |
| | | | 27 | 15 | 85 |
| | | | 28 | 10 | 90 |
| | | | 29 | 10 | 90 |
| | | | 30 | 5 | 95 |

Similar results were obtained on substituting di-n-butyl fumarate and di-n-butyl maleate for the di-n-butyl succinate in the above formulae. Also, as described in Serial No. 570,696 improved results due to a synergistic effect were obtained by adding an unsaturated fatty acid such as for example 6 parts by weight of oleic acid to the formula of Example 3. In place of oleic acid other unsaturated faty acids may be used such as linoleic acid, ricenoleic acid, olive oil and the like.

All types of wax compositions can be used in the practice of this invention. A solid wax composition can be made by simply melting the paraffin wax and dissolving the lower alkyl ester of the dicarboxylic acid in the molten wax. Candles, for example, could be made in this manner.

Another wax composition which has given satisfactory results is a floor wax emulsion having the following formula, the amounts being in parts by weight:

| | Percent |
|---|---|
| Carnauba wax | 3.2 |
| Beeswax | 1.3 |
| Oleic acid | 2.6 |
| Triethynol amine | 1.5 |
| Naphtha | 10.0 |
| Rosin | 1.75 |
| Di-n-butyl fumarate | 1.0 |
| Water sufficient to bring the total to 100%. | |

Another suitable wax composition, this time of the solvent type instead of the above emulsion type wax, has the following formula:

| | Percent |
|---|---|
| Carnauba wax | 10 |
| Oleic acid | 2.5 |
| Di-n-propyl maleate | 1 |
| Mineral oil | 87.5 |

While I have described certain preferred embodiments of my invention, many modifications thereof may be made without departing from the spirit of the invention; and I do not wish to be limited to the detailed examples, formulas and proportions of ingredients herein set forth, but desire to avail myself of all changes within the scope of the appended claims.

The invention claimed is:

1. A method of repelling roaches comprising placing on the surface of an area likely to be inhabited by roaches a polishing wax composition containing homogeneously dispersed throughout from .2% to 50% by weight on the basis of the solid content of the composition of an alkyl diester of a four-carbon atom dicarboxylic acid, said alkyl radical selected from the group consisting of normal propyl and normal butyl, said composition being applied in an amount such as to give from 20 to 500 milligrams of the ester per square foot of the surface and buffing said surface when the repellency thereof diminishes whereby active repellency is restored.

2. A method of repelling insects from a surface comprising placing on the surface a polishing wax composition containing homogeneously dispersed therein from about 0.2% to about 50% by weight on the basis of the solid content of the composition of an alkyl di-ester of a four-carbon atom dicarboxylic acid, the alkyl radicals being selected from a group consisting of n-propyl and n-butyl, said composition being applied in an amount to give from 20 to 500 mgs. of ester per square foot of surface, and buffing said surface when the repellency thereof diminishes whereby active repellency is restored.

3. A polishing wax composition capable of repelling insects from a hard surface to which it is applied and capable of having repellent activity restored by buffing said hard waxed surface after the initial repellency diminishes, comprising a polishing wax having homogeneously dispersed therein from about 0.2% to about 50% by weight on the basis of the total solids content of an alkyl di-ester of a four-carbon atom dicarboxylic acid, the alkyl radicals being selected from the group consisting of n-propyl and n-butyl.

References Cited in the file of this patent
UNITED STATES PATENTS

| | | |
|---|---|---|
| 1,439,053 | Armitage | Dec. 19, 1922 |
| 1,911,551 | Cleveland | May 30, 1933 |
| 1,963,955 | Cleveland | June 26, 1934 |
| 1,995,247 | Haring | Mar. 19, 1935 |
| 2,349,434 | Hyman | May 23, 1944 |
| 2,697,964 | Kennedy | Aug. 31, 1954 |
| 2,888,379 | Bruning | May 26, 1959 |

OTHER REFERENCES

King: U.S. Dept. Agr. Handbook No. 69, May 1954, pp. 176, 220, 316.

Smith: Jour. Econ. Ent., vol. 42, June 1949, pp. 439–440.